United States Patent
Kestler

(10) Patent No.: US 10,559,951 B1
(45) Date of Patent: Feb. 11, 2020

(54) TRANSLATING WIRE HARNESS

(71) Applicant: ROHR, INC., Chula Vista, CA (US)

(72) Inventor: Steven M. Kestler, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 16/442,921

(22) Filed: Jun. 17, 2019

(51) Int. Cl.
  *H02G 11/02* (2006.01)
  *B64D 29/00* (2006.01)
  *H01B 7/00* (2006.01)

(52) U.S. Cl.
  CPC .............. *H02G 11/02* (2013.01); *B64D 29/00* (2013.01); *H01B 7/0045* (2013.01); *B64D 2221/00* (2013.01)

(58) Field of Classification Search
  CPC .... H02G 11/02; B64D 29/00; B64D 2221/00; H01B 7/0045
  USPC ........................................................ 174/72 A
  See application file for complete search history.

(56) References Cited

U.S. PATENT DOCUMENTS

| | | | |
|---|---|---|---|
| 4,000,558 A * | 1/1977 | Cahill | H01B 7/0838 29/850 |
| 5,597,141 A | 1/1997 | Storaasli | |
| 6,067,835 A * | 5/2000 | Pollock | B21F 1/02 140/147 |
| 7,753,344 B1 | 7/2010 | Moretz | |
| 9,939,600 B2 | 4/2018 | Holmberg et al. | |
| 2017/0283081 A1* | 10/2017 | Kestler | B64D 29/06 |
| 2017/0330647 A1* | 11/2017 | Xiao | E21B 17/003 |
| 2018/0129008 A1 | 5/2018 | Gonzalez Covarrubias et al. | |

* cited by examiner

*Primary Examiner* — Sherman Ng
(74) *Attorney, Agent, or Firm* — Snell & Wilmer L.L.P.

(57) ABSTRACT

A translating wire harness includes a first portion, a second portion configured to translate relative to the first portion, a wire spool coupled to the first portion, and an electrical wire at least partially wound onto the wire spool, wherein the electrical wire at least partially unwinds from the wire spool in response to the second portion translating away from the first portion, and the electrical wire at least partially winds into the wire spool in response to the second portion translating towards the first portion, a portion of the electrical wire extending between the first portion and the second portion remains taught during translating of the second portion both (a) away from and (b) towards the first portion.

18 Claims, 5 Drawing Sheets

TRANSLATING WIRE HARNESS

FIELD

The present disclosure relates generally to wire harnesses, and more particularly to wire harnesses for moving parts.

BACKGROUND

In order to power electric systems, a wired connection may be routed from a power controller or generator to an electronic component. For moveable structures, slack is typically designed into the wiring that is made taut when the moveable structures are moved away from each other. When the moveable structures are moved back towards each other, the slack is again returned to the wiring. Stresses may be introduced into the wiring and mechanical interference between the moveable structures and wiring may occur in response to the relative movement between moveable structures.

SUMMARY

A translating wire harness is disclosed, comprising a translating portion, a wire spool, and an electrical wire at least partially wound onto the wire spool, wherein the electrical wire at least partially unwinds from the wire spool in response to the translating portion translating away from the wire spool, and the electrical wire at least partially winds into the wire spool in response to the translating portion translating towards the wire spool, a portion of the electrical wire extending between the translating portion and the wire spool remains taught during translating of the translating portion both (a) away from and (b) towards the wire spool.

In various embodiments, the translating wire harness further comprises a connector coupling a fixed portion of the electrical wire to the translating portion.

In various embodiments, the fixed portion of the electrical wire remains fixed with respect to the translating portion during translating of the translating portion both (a) away from and (b) towards the wire spool.

In various embodiments, the electrical wire extends from the wire spool to a power source, and the electrical wire extends from the wire spool to the translating portion.

In various embodiments, the electrical wire extends through a channel defined through the translating portion.

In various embodiments, the translating wire harness further comprises a second connector coupling the fixed portion of the electrical wire to the translating portion.

In various embodiments, the connector and the second connector are coupled to the translating portion at opposite ends of the channel.

In various embodiments, the wire spool comprises a spring member configured to bias a spool towards a wound position.

In various embodiments, a tension force through the electrical wire overcomes the bias of the spring member in response to the translating portion translating away from the wire spool.

In various embodiments, a portion of the electrical wire extending from the wire spool to the power source remains fixed with respect to the wire spool during translating of the translating portion both (a) away from and (b) towards the wire spool.

A translating inlet assembly for a nacelle is disclosed, the translating inlet assembly comprising a first portion, a second portion configured to translate relative to the first portion, a wire spool coupled to the first portion, and an electrical wire at least partially wound onto the wire spool, wherein the electrical wire at least partially unwinds from the wire spool in response to the second portion translating away from the first portion, and the electrical wire at least partially winds into the wire spool in response to the second portion translating towards the first portion, wherein a portion of the electrical wire extending between the first portion and the second portion remains taught during translating of the second portion both (a) away from and (b) towards the first portion.

In various embodiments, the translating inlet assembly further comprises a connector coupling a fixed portion of the electrical wire to the second portion, wherein the fixed portion of the electrical wire remains fixed with respect to the second portion during translating of the second portion both (a) away from and (b) towards the first portion.

In various embodiments, the electrical wire extends from the wire spool to a power source, and the electrical wire extends from the wire spool to the second portion.

In various embodiments, the translating inlet assembly further comprises a guide rod extending from the second portion, wherein the guide rod is located through an orifice defined by the first portion.

In various embodiments, the translating inlet assembly further comprises a track located in the first portion, and a rail coupled to the second portion and configured to translate along the track, wherein the rail and the track form a load bearing component configured to transfer inertial loads experienced by the second portion, wherein the rail is driven along the track.

In various embodiments, the electrical wire extends through a channel defined by at least one of the rail or the guide rod.

In various embodiments, the second portion comprises at least one of the rail or the guide rod.

An electrical wire retention method for a translating arrangement is disclosed, the method comprising translating, by a second portion, with respect to a first portion, retaining, by a wire spool, a wound portion of an electrical wire, wherein the wire spool is coupled to the first portion, and applying, by the wire spool, tension to a portion of the electrical wire extending between the first portion and the second portion.

In various embodiments, the method further comprises unwinding, by at least a portion of the wound portion of the electrical wire, from wire spool in response to the second portion translating away from the first portion.

In various embodiments, the method further comprises winding, by the unwound portion of the electrical wire, into the wire spool in response to the second portion translating towards the first portion, wherein the portion of the electrical wire extending between the first portion and the second portion remains taught during translating of the second portion both (a) away from and (b) towards the first portion.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 1A illustrates a schematic view of a translating wire harness in a wound position with a second portion translated towards a first portion, in accordance with various embodiments;

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Surface shading and/or crosshatching lines may be used throughout the figures to denote different parts, but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

A translating wire harness, as disclosed herein, comprises a wire spool which retains extra electrical wire while a second structure is translated towards a first static structure. Confining the electrical wire, or power cable, to the first static structure may allow for wiring on both the translating and static portions to remain static in reference to the surfaces they are affixed to, which eliminates stresses that tend to fatigue or break the wire. A translating wire harness, as disclosed herein, may reduce the total space occupied by the translating wire harness.

Figure 1A:
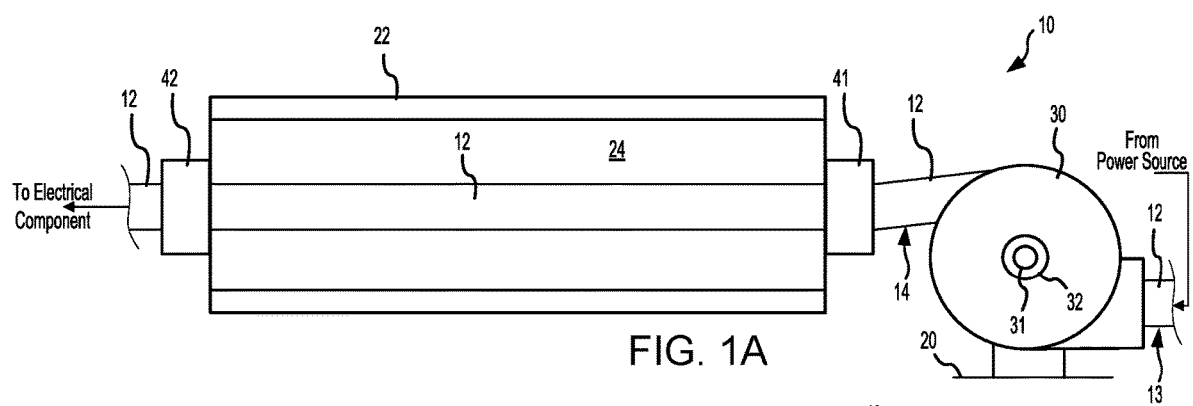
FIG. 1B illustrates a schematic view of a translating wire harness in an unwound position with a second portion translated away from a first portion, in accordance with various embodiments.

With reference to FIG. 1A, a translating wire harness arrangement 10 (also referred to herein as a wire harness arrangement) is illustrated, in accordance with various embodiments. Wire harness arrangement 10 includes a first structure 20 (also referred to herein as a first portion) and a second structure 22 (also referred to herein as a second portion or a translating portion) configured to translate with respect to the first structure 20. In various embodiments, second structure 22 comprises an electrical conduit. In various embodiments, first structure 20 comprises a first portion of a translating inlet assembly and second structure 22 comprises a second portion of the translating inlet assembly (e.g., see first portion 120 and second portion 122, respectively, of a translating inlet assembly 102 described below with respect to FIGS. 2A through FIG. 3). It should be understood, however, that the concepts described herein are not limited to use with translating inlet assemblies as the teachings may be applied to other types of arrangements which incorporate electrical wiring extending between two structures moveable with respect to each other.

A power source may be coupled to first portion 20. The second portion 22 may translate with respect to the first portion 20 and the power source. It may be desirable to provide electric power to an electrical component that is coupled to second portion 22. In this regard, an electrical wire may extend from the power source to the electrical component. As used herein, the term "electrical wire" refers to a wire capable of conducting electricity, such as a metal wire. Wire harness arrangement further comprises a wire spool 30 mounted to first portion 20. The wire spool 30 is provided to retain a length of the electrical wire 12 included to accommodate movement of second portion 22 with respect to first portion 20. With particular focus on FIG. 1B, in response to second portion 22 translating away from first portion 20, a length L of the electrical wire 12 may unwind from the wire spool 30 to accommodate the translation without binding or significant stress to electrical wire 12. Likewise, in response to second portion 22 translating towards first portion 20, as illustrated in FIG. 1A, the length L of the electrical wire 12 may wind into the wire spool 30 to safely and cleanly store the excess wire. In various embodiments, the portion 14 of the electrical wire 12 extending between the first portion 20 and the second portion 22 remains taught during translating of the second portion 22 both (a) away from and (b) towards the first portion 20. By keeping electrical wire 12 taught, wire spool 30 aids in preventing mechanical interference of electrical wire 12 with adjacent moving parts, such as second portion 22. In various embodiments, the portion of the electrical wire 12 extending between the first portion 20 and the power source, seen at arrow 13, remains fixed with respect to first portion 20 during translating of the second portion 22 both (a) away from and (b) towards the first portion 20. In this manner, stresses in electrical wire 12 that may lead to fatigue of electrical wire 12 tend to be minimized.

Figure 1B:
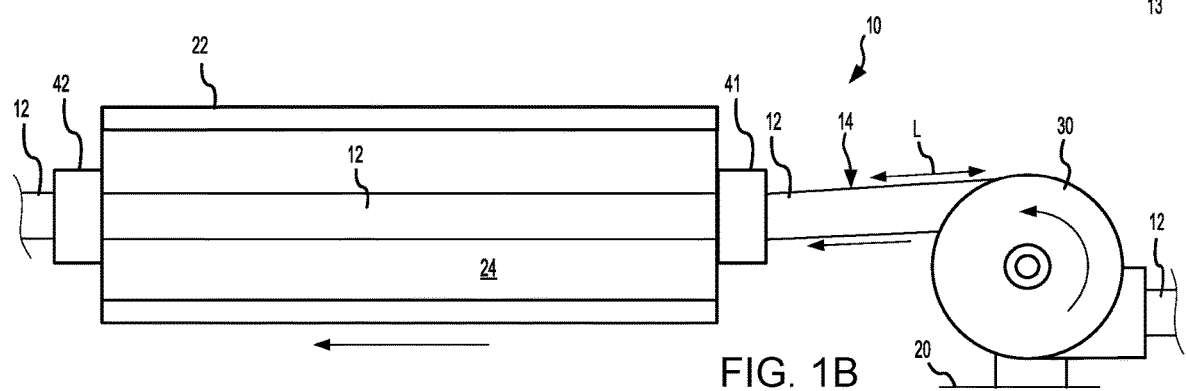

In various embodiments, wire spool 30 comprises a spring member 31 operatively coupled to a spool 32. The spring member 31 biases the spool 32 in a rotational direction towards a wound position, as illustrated in FIG. 1A, to wind electrical wire 12 into wire spool 30. As second portion 22 translates away from first portion 20, the tension force exerted on electrical wire 12 overcomes the bias of spring member 31 to unwind electrical wire 12 from wire spool 30, as illustrated in FIG. 1B. The spring member 31 may be configured such that a relatively small tension force is exerted on electrical wire 12 during the translation to maintain structural integrity of electrical wire 12. In various embodiments, spring member 31 comprises a coil spring, or the like.

Wire harness arrangement 10 may comprise a first connector 41. First connector 41 may be coupled to a first end of second portion 22. Wire harness arrangement 10 may comprise a second connector 42. Second connector 42 may be coupled to a second end of second portion 22. First connector 41 and second connector 42 may be coupled to opposite ends of second portion 22. In this manner, first connector 41 and second connector 42 may secure electrical wire 12 relative to second portion 22 to prevent tangling of electrical wire 12 or mechanical interference of electrical wire 12 with adjacent moving parts, such as second portion 22. Electrical wire 12 may extend through a channel 24 disposed through second portion 22. First connector 41 may secure electrical wire 12 in a fixed position with respect to second portion 22. Second connector 42 may similarly secure electrical wire 12 in a fixed position with respect to second portion 22. In this manner, electrical wire 12 is fixed with respect to second portion 22 during translation of second portion 22 with respect to first portion 20. First connector 41 and/or second connector 42 may comprise any type of connector suitable for securing an electrical wire to second portion 22. First connector 41 and/or second connector 42 may be made from metal, plastic, carbon fiber, rubber, or any other suitable material. In various embodiments, second portion 22 is a tube (e.g., see guide rod 134 of FIG. 3) and first connector 41 and/or second connector 42 comprise an end cap or grommet type connector, for example.

Figure 2A:
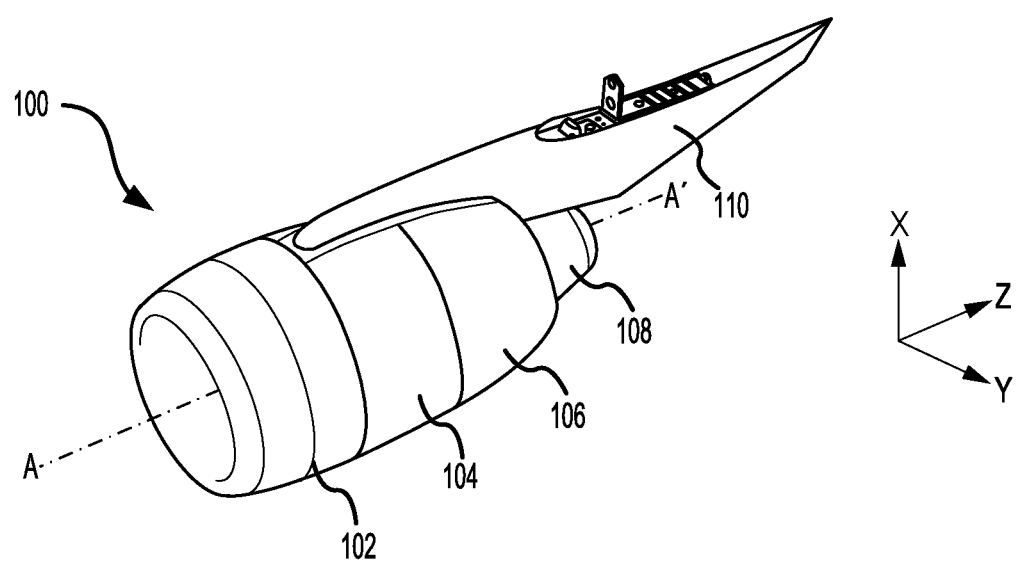
FIG. 2A illustrates a perspective view of a nacelle, in accordance with various embodiments.

Referring to FIG. 2A, a nacelle 100 for a propulsion system is illustrated, in accordance with various embodiments. Nacelle 100 may comprise a translating inlet assembly 102, a fan cowl 104, a thrust reverser 106, and an exhaust system 108. In various embodiments, nacelle 100 may include a pylon 110. Pylon 110 may be configured to mount nacelle 100 and an engine surrounded by nacelle 100 to an aircraft structure 118, with momentary reference to FIG. 3, such as a wing or aircraft fuselage.

Figure 2B:
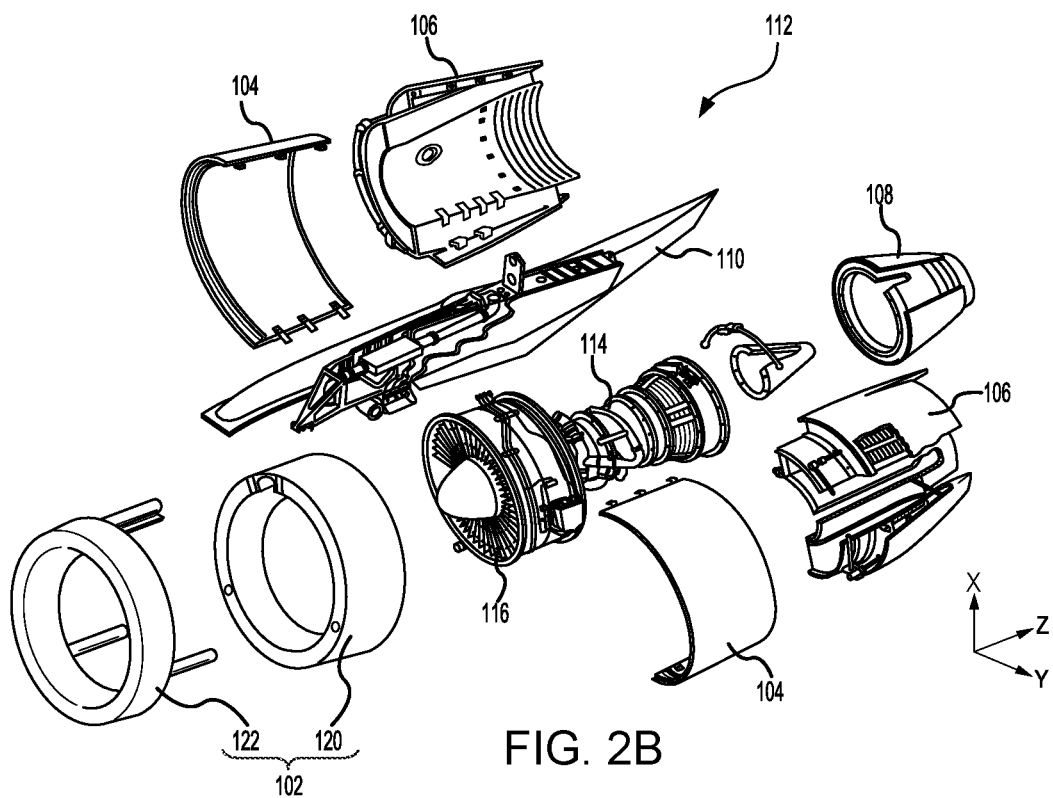
FIG. 2B illustrates an exploded view of a propulsion system, in accordance with various embodiments.

With reference to FIG. 2B, and continuing reference to FIG. 2A, an exploded view of a propulsion system 112 is illustrated, in accordance with various embodiments. In accordance with various embodiments, propulsion system 112 includes nacelle 100 and a gas turbine engine 114. Gas turbine engine 114 may be surrounded by components of nacelle 100. Nacelle 100 may provide smooth, aerodynamic surfaces for airflow around and into gas turbine engine 114.

In operation, a fan 116 of gas turbine engine 114 draws and directs a flow of air into and through propulsion system 112. Although gas turbine engine 114 is depicted as a turbofan gas turbine engine herein, it should be understood that the concepts described herein are not limited to use with turbofans as the teachings may be applied to other types of turbine engines including turbojet engines, low-bypass turbofans, high bypass turbofans, or any other gas turbine. In various embodiments, gas turbine engine 114 may be configured to produce supersonic aircraft speeds.

In accordance with various embodiments, nacelle 100 includes a translating inlet assembly 102. Translating inlet assembly 102 may include a first portion 120 and a second portion 122. Second portion 122 is located forward of first portion 120. Second portion 122 is configured to translate relative to the first portion 120. In this regard, first portion 120 may be a stationary component, which does not translate relative to other structures (e.g., fan cowl 104, pylon 110) of nacelle 100. In various embodiments, first portion 120 may be coupled forward of fan 116 of gas turbine engine 114.

In accordance with various embodiments, translating inlet assembly 102 is configured such that second portion 122 is located a first axial distance from first portion 120 during a first flight condition and a second axial distance from first portion 120 during a second flight condition. It is contemplated and understood that translating inlet assembly 102 may be configured to translate second portion 122 during any desired flight conditions. For example, in various embodiments, when propulsion system 112 is producing a first speed, second portion 122 may be located a first axial distance from first portion 120, and when propulsion system 112 is producing a second speed, different from the first speed, second portion 122 may be located a second, greater axial distance from first portion 120.

Figure 3:
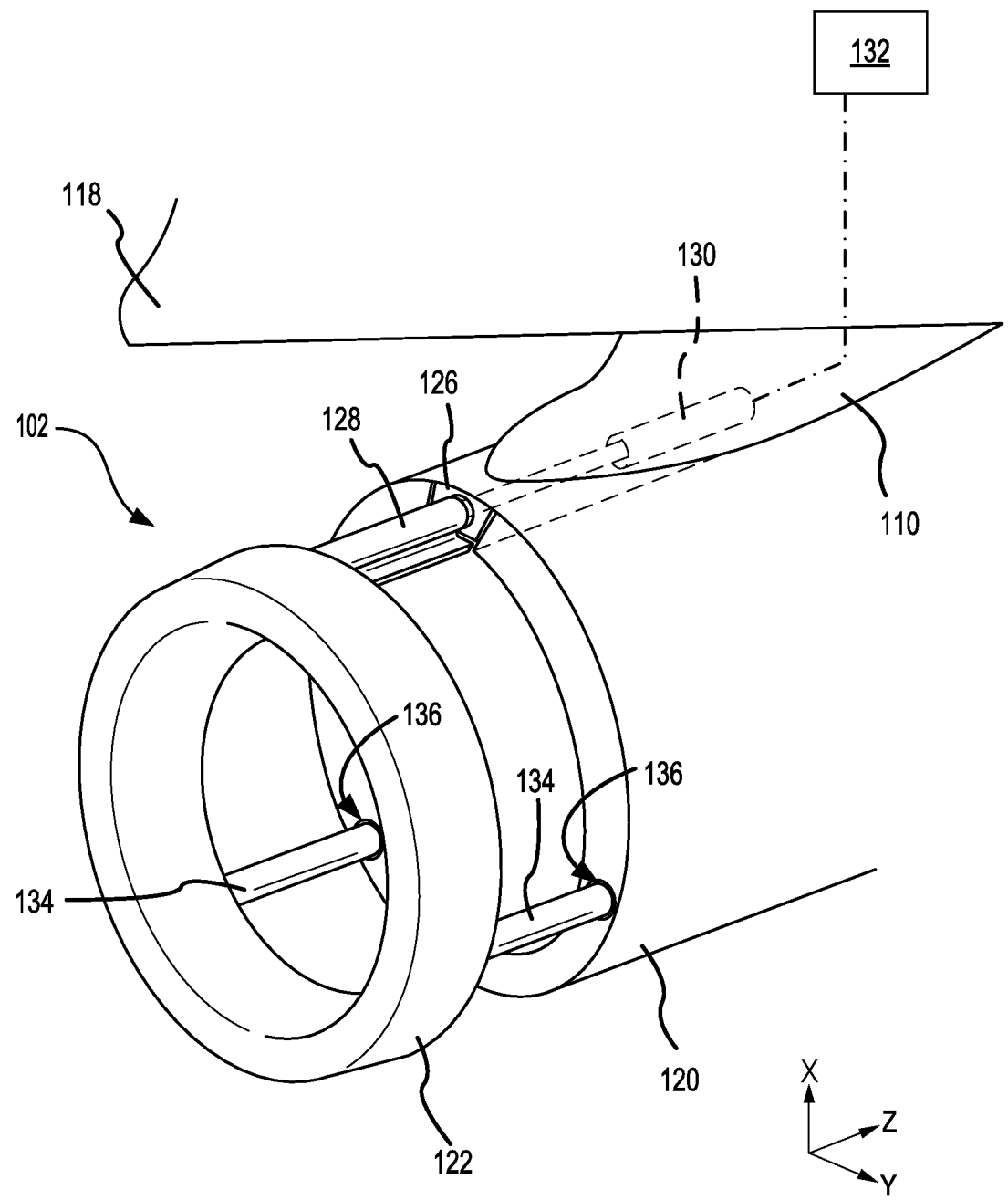
FIG. 3 illustrates a perspective view of a translating inlet assembly for a nacelle, in accordance with various embodiments.

Referring to FIG. 3, translating inlet assembly 102 may include a track 126 and a rail 128. Track 126 may be located within first portion 120. Stated differently, first portion 120 may define a channel configured to receive to track 126. Track 126 is coupled to pylon 110. In various embodiments, track 126 may be integral to pylon 110. Track 126 may be configured to transfer loads (e.g., inertial loads) experienced by second portion 122 to pylon 110.

Rail 128 may be coupled to second portion 122. Rail 128 extends aftward from second portion 122. Rail 128 may be configured to translate along track 126. Translation of rail 128 along track 126 drives the translation of second portion 122 relative to first portion 120. Rail 128 may be coupled to second portion 122 and track 126 such that loads experienced by second portion 122 are transferred to track 126 via rail 128. In this regard, track 126 and rail 128 may form a load bearing component configured to structurally support second portion 122 and transfer loads (e.g., inertial loads) experienced by second portion 122 to pylon 110.

In accordance with various embodiments, translating inlet assembly 102 may further include an actuator 130. Actuator 130 may be operationally coupled to rail 128. Actuator 130 may be configured to drive translation of rail 128 and second portion 122. Actuator 130 may comprise an electric, hydraulic, pneumatic, or any other type actuator capable of driving translation of rail 128 and second portion 122. In various embodiments, actuator 130 is a linear actuator.

In various embodiments, a controller 132 is in operable communication with actuator 130. Controller 132 may control actuation of actuator 130 and thus the translation of rail 128 and second portion 122. For example, controller 132 may send actuation commands to actuator 130. Controller 132 may be a standalone controller or controller 132 may be incorporated into an overall control for gas turbine engine 114, such as a full authority digital engine control (FADEC).

In various embodiments, translating inlet assembly 102 may further include one or more guide rods 134. Guide rods 134 may be coupled to second portion 122. Guide rods 134 extend aftward from second portion 122. In various embodiments, guide rods 134 are each located through an orifice 136 defined by first portion 120. Stated differently, first portion 120 may define orifices 136 configured to receive guide rods 134. Guide rods 134 may help to stabilize second portion 122 during translation.

With combined reference to FIG. 1A and FIG. 3, second structure 22 may comprise second portion 122, in accordance with various embodiments. In various embodiments, second structure 22 may comprise a guide rod 134 and first structure 20 may comprise first portion 120, in accordance with various embodiments. In various embodiments, second structure 22 may comprise a rail 128 and first structure 20 may comprise first portion 120, in accordance with various embodiments. In this regard, electrical wire 12 may be routed between first portion 120 and second portion 122 through guide rod 134 or rail 128.

Figure 4:
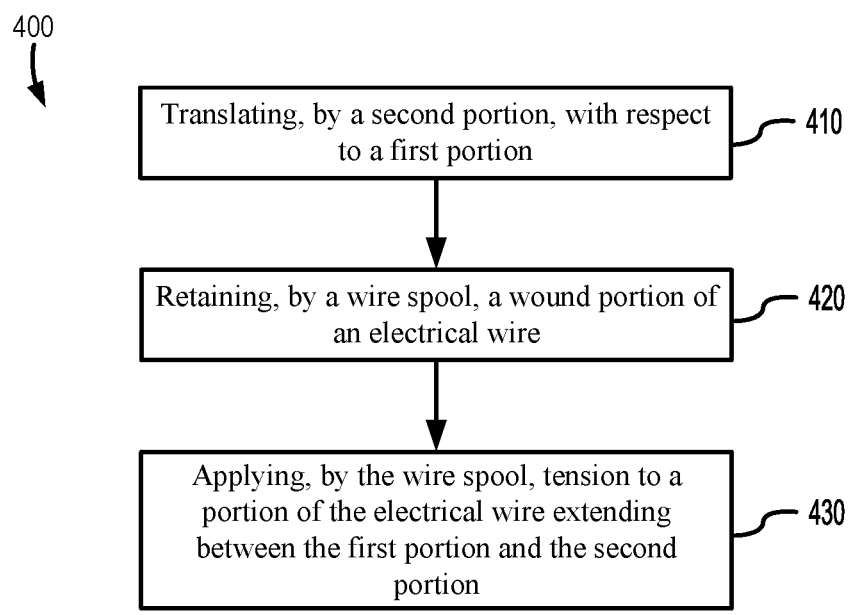
FIG. 4 illustrates a flow chart for an electrical wire retention method, in accordance with various embodiments.

With reference to FIG. 4, an electrical wire retention method 400 for a translating arrangement is provided, in accordance with various embodiments. Method 400 includes translating, by a second portion, with respect to a first portion (step 410). Method 400 includes retaining, by a wire spool, a wound portion of an electrical wire (step 420). Method 400 includes applying, by the wire spool, tension to a portion of the electrical wire extending between the first portion and the second portion (step 430).

With combined reference to FIG. 1A, FIG. 1B, and FIG. 4, step 410 may include translating, by second portion 22, with respect to first portion 20. Step 420 may include unwinding, by length L of the electrical wire 12, from wire spool 30 in response to the second portion 22 translating away from the first portion 20. Step 430 may include applying, by wire spool 30, tension to the portion 14 of the electrical wire 12 extending between the first portion 20 and the second portion 22. Step 410 may further include unwinding, by at least a portion of the wound portion of the electrical wire 12, from wire spool 30 in response to the second portion 22 translating away from the first portion 20. Step 410 may further include winding, by the unwound portion of the electrical wire (e.g., length L of the electrical wire 12), into the wire spool 30 in response to the second portion 22 translating towards the first portion 20.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A translating wire harness comprising: a translating portion; a wire spool; and an electrical wire at least partially wound onto the wire spool, wherein the electrical wire at least partially unwinds from the wire spool in response to the translating portion translating away from the wire spool, and the electrical wire at least partially winds into the wire spool in response to the translating portion translating towards the wire spool, a portion of the electrical wire extending between the translating portion and the wire spool remains taught during translating of the translating portion both (a) away from and (b) towards the wire spool.

2. The translating wire harness of claim 1, further comprising a connector coupling a fixed portion of the electrical wire to the translating portion.

3. The translating wire harness of claim 2, wherein the fixed portion of the electrical wire remains fixed with respect to the translating portion during translating of the translating portion both (a) away from and (b) towards the wire spool.

4. The translating wire harness of claim 1, wherein the electrical wire extends from the wire spool to a power source, and the electrical wire extends from the wire spool to the translating portion.

5. The translating wire harness of claim 3, wherein the electrical wire extends through a channel defined through the translating portion.

6. The translating wire harness of claim 5, further comprising a second connector coupling the fixed portion of the electrical wire to the translating portion.

7. The translating wire harness of claim 6, wherein the connector and the second connector are coupled to the translating portion at opposite ends of the channel.

8. The translating wire harness of claim 1, wherein the wire spool comprises a spring member configured to bias a spool towards a wound position.

9. The translating wire harness of claim 8, wherein a tension force through the electrical wire overcomes the bias of the spring member in response to the translating portion translating away from the wire spool.

10. The translating wire harness of claim 4, wherein a portion of the electrical wire extending from the wire spool to the power source remains fixed with respect to the wire spool during translating of the translating portion both (a) away from and (b) towards the wire spool.

11. A translating inlet assembly for a nacelle, the translating inlet assembly comprising: a first portion; a second portion configured to translate relative to the first portion; a wire spool coupled to the first portion; and an electrical wire at least partially wound onto the wire spool, wherein the electrical wire at least partially unwinds from the wire spool in response to the second portion translating away from the first portion, and the electrical wire at least partially winds into the wire spool in response to the second portion translating towards the first portion, wherein a portion of the electrical wire extending between the first portion and the second portion remains taught during translating of the second portion both (a) away from and (b) towards the first portion.

12. The translating inlet assembly of claim 11, further comprising a connector coupling a fixed portion of the electrical wire to the second portion, wherein the fixed portion of the electrical wire remains fixed with respect to the second portion during translating of the second portion both (a) away from and (b) towards the first portion.

13. The translating inlet assembly of claim 11, wherein the electrical wire extends from the wire spool to a power source, and the electrical wire extends from the wire spool to the second portion.

14. The translating inlet assembly of claim 11, further comprising a guide rod extending from the second portion, wherein the guide rod is located through an orifice defined by the first portion.

15. The translating inlet assembly of claim 14, further comprising: a track located in the first portion; and a rail coupled to the second portion and configured to translate along the track, wherein the rail and the track form a load bearing component configured to transfer inertial loads experienced by the second portion, wherein the rail is driven along the track.

16. The translating inlet assembly of claim 15, wherein the electrical wire extends through a channel defined by at least one of the rail or the guide rod.

17. The translating inlet assembly of claim 16, wherein the second portion comprises at least one of the rail or the guide rod.

18. An electrical wire retention method for a translating arrangement, the method comprising: translating, by a second portion, with respect to a first portion; retaining, by a wire spool, a wound portion of an electrical wire, wherein the wire spool is coupled to the first portion; applying, by the wire spool, tension to a portion of the electrical wire extending between the first portion and the second portion; unwinding, by at least a portion of the wound portion of the electrical wire, from the wire spool in response to the second portion translating away from the first portion; and winding, by the electrical wire, into the wire spool in response to the second portion translating towards the first portion; wherein the portion of the electrical wire extending between the first portion and the second portion remains taught during translating of the second portion both (a) away from and (b) towards the first portion.

* * * * *